HANNAH C. GASKIN, OF UNION VALE, NEW YORK.

Letters Patent No. 83,149, dated October 20, 1868.

IMPROVED PLASTIC COMPOSITION.

The Schedule referred to in these Letters Patent and making part of the same.

*To all whom it may concern:*

Be it known that I, HANNAH C. GASKIN, of the town of Union Vale, in the county of Dutchess, and State of New York, have invented a new Plastic Composition for making ornamental work resembling carved wood; and I do hereby declare that the following is a full and exact description thereof.

The composition named is made of glue, water, resin, alcohol, and browned wheat flour, or starch, in the following proportions, and in the following manner:

Place a vessel containing one pound of glue, covered with cold water, in a vessel of boiling water. Stir it frequently until dissolved. Take it out and let it stand until it assumes the consistency of thick cream. Add as much flour, previously browned to a dark yellow brown over a fire, as can be stirred in with a strong spoon. Then add one ounce of rosin, previously dissolved in alcohol, and mix thoroughly.

Take a small quantity, (two square inches for one square foot of surface,) and add warm water to it gradually until it is of the consistency of thick cream. With this, cover the wood to be ornamented, using a bristle brush. Let it dry one day. Cover it the same again, and a third time if the wood is not thoroughly covered so as to appear of the color of black walnut. If the surface is small and smooth, the composition can be put on without being thinned with water, and be smoothed with the finger wet in cold water.

When the surface is covered and dry, it can be ornamented in the following manner: Take the vessel containing the composition and fill it with cold water. Then pour the water off, cover the vessel, and place it in boiling water or over steam until the composition becomes as soft as when first mixed. Then, with the fingers wet in cold water, take up pieces and mould them in any form desired, and lay them on the surface prepared for them. They will adhere directly.

Flowers, leaves, and various ornaments can thus be formed with the fingers. Pins and moulds, such as are used in making wax flowers, can be used for making indentations, veining, &c. Little figures can also be modelled by using wire, needles, or pieces of wood for support. Moulds can be used by placing a mass of the composition on the surface prepared for it, and pressing the mould, wet with cold water, upon it. A thick mass of the composition requires several days for hardening; where it is thin, a few hours. When the ornaments made are sufficiently dry and hard to resist the pressure of a brush, wash them over with alcohol every day, to prevent moulding, until thoroughly hard.

I claim—

1. A plastic composition of flour or starch, treated substantially as described, in combination with glue, resin, gum, or other equivalent substance, as described.

2. The new article of plastic manufacture, substantially as described.

HANNAH C. GASKIN.

Witnesses:
SAMUEL C. VAIL,
STEPHEN M. VAIL.